United States Patent
Furuya et al.

(10) Patent No.: US 6,664,668 B2
(45) Date of Patent: Dec. 16, 2003

(54) ROTOR FOR SMALL MOTORS AND MANUFACTURING METHOD THEREFOR

(75) Inventors: Kenji Furuya, Matsudo (JP); Satoshi Ashikawa, Matsudo (JP)

(73) Assignee: Mabuchi Motor Co., Ltd. (JP)

( * ) Notice: Subject to any disclaimer, the term of this patent is extended or adjusted under 35 U.S.C. 154(b) by 9 days.

(21) Appl. No.: 10/359,418

(22) Filed: Feb. 6, 2003

(65) Prior Publication Data

US 2003/0122444 A1 Jul. 3, 2003

Related U.S. Application Data

(62) Division of application No. 10/075,935, filed on Feb. 14, 2002.

(30) Foreign Application Priority Data

Mar. 1, 2001 (JP) .......................................... 2001-056678

(51) Int. Cl.$^7$ .............................................. H02K 15/00
(52) U.S. Cl. ........................... 310/42; 310/234; 310/71; 29/597
(58) Field of Search ................................. 310/233, 234, 310/270, 71, 42; 29/596, 597, 598, 605, 606

(56) References Cited

U.S. PATENT DOCUMENTS

| | | | | |
|---|---|---|---|---|
| 2,476,795 A | * | 7/1949 | Avigdor | 310/233 |
| 5,113,574 A | * | 5/1992 | Nuss | 29/597 |
| 5,115,557 A | * | 5/1992 | Visser et al. | 29/597 |
| 6,153,960 A | * | 11/2000 | Katagiri et al. | 310/269 |

* cited by examiner

Primary Examiner—Dang Le
(74) Attorney, Agent, or Firm—McGlew and Tuttle, P.C.

(57) ABSTRACT

The leading end of a wire to be wound fed from a coil winder is wound around one of commutator leg parts a prescribed number of turns and then wound around a corresponding salient pole. After that, it is similarly wound successively around other commutator leg parts and around other salient poles and, after it is wound around the same commutator leg part as the one around which the leading end of the wire was first wound, the wound wire is cut. Only the portions that will be wound around the commutator leg parts in synchronization with the feed of the wire to be wound from the coil winder are stripped of their insulating coat prior to being wound, and the wound portions of the commutator leg parts are welded.

5 Claims, 6 Drawing Sheets

(a)  (b)  (c)  (d)  (e)

Commutator unit

Commutator fitting   Commutator leg part

Commutator unit

Varistor

Electrode

Parent metal sheet to punch out commutator leg parts

Commutator leg part

Rotor

ROTOR FOR SMALL MOTORS AND MANUFACTURING METHOD THEREFOR

This a Divisional of application Ser. No. 10/075,935 filed Feb. 14, 2002, and the entire disclosure of this prior application is considered to be part of the disclosure of the accompanying application and is hereby incorporated by reference therein.

BACKGROUND OF THE INVENTION

1. Field of the Invention

The present invention relates to a rotor for small motors, which permits electrically satisfactory coupling of the ends of a wound wire with the leg parts of a commutator in an easy operation and a manufacturing method therefor.

2. Description of the Related Art

Connection of each commutator segment and a wound wire end according to the prior art will be described with reference to FIG. 7. FIG. 7 shows a schematic perspective view of the commutator unit of a small motor. In the drawing, reference numeral 11 denotes the shaft of a rotor; 22, a commutator segment; 24, a commutator core; and 26, a commutator leg part. Thus the commutator unit is composed of commutator segments 22 arranged over a resin-made commutator core 24 and commutator leg parts 26, each formed integrally with and at the end of a commutator segment 22 for connecting a wound wire end. FIG. 8 shows a profile of the commutator unit shown in FIG. 7 in a state of being coupled with a wound wire end. The commutator leg part 26, as illustrated, is caused to press down a wound wire end by being bent toward the commutator segment, and is spot-welded.

FIG. 9 shows a varistor alone on its right part and the varistor in a fitted and connected state in the left part. In a small motor having a commutator, when a brush in sliding contact with the commutator passes between commutator segments, an arc is generated, and this arc may jam communication equipment or shorten the useful life of the brush. To solve these problems, fitting a varistor to the rotor of the motor as a spark suppressing element is a known art. An example of such varistor has the shape shown in the right part of FIG. 9. Its overall shape is a doughnut-like disk, and has as many electrodes as the magnetic poles of the rotor, i.e. as many as the commutator segments. Each electrode of this varistor 21 is soldered onto one or another of the commutator leg parts 26. This soldering not only electrically connects the varistor 21 but also is mechanically fixed concentrically with the commutator unit 20.

A wire as a conductor for use in electronic parts, including wound wires for such small motors, usually has an insulating coat, consisting of an insulating material such as urethane, polyester or the like. Whereas the wound wire of a small motor requires electrical and mechanical connection of its ends to each commutator leg part, if a material with a low melting point is used as the insulating coat of the wound wire, the wound wire ends and each commutator leg part have to be arc-coupled to melt and remove the insulating coat by the arc heat, and accordingly electrical connection can be adequately established without needing any special work.

However, where a material of a high melting point is used as the insulating coat of the wound wire, it is difficult to melt by the arc heat, resulting in the problem of impossibility to establish adequate electrical connection. Moreover, toxic gas may be generated by the burning of the insulating coat, necessitating a pollution-preventive measure.

SUMMARY OF THE INVENTION

An object of the present invention, therefore, is to solve the problems noted above and make possible adequate electrical connection with commutator leg parts even if a high-melting-point material difficult to be melted by the arc heat is used as the insulating coat of the wound wire.

Another object of the invention is to make it possible to choose the most suitable material for the commutator leg parts to be connected to the insulator-coated wire and thereby to enhance the reliability of connection by virtually limiting the wire material, even though many different kinds of insulator-coated wires are used, to copper alone by stripping the insulating coat.

A rotor for small motors and a manufacturing method therefor according to the invention are such that a plurality of rotor magnetic poles of a salient-pole configuration and a commutator unit are provided on the shaft of the rotor, each of the rotor magnetic poles being composed of a winding around a laminated core and each of both ends of each wound wire being connected to a commutator leg part coupled with a tip of a corresponding commutator segment of the commutator unit. The leading end of a wire to be wound fed from a coil winder is wound around one of commutator leg parts a first prescribed number of turns, then wound around a corresponding salient pole a second prescribed number of turns, thereafter similarly wound successively around other commutator leg parts and other salient poles, and wound around the same commutator leg part around which the leading end of the wire to be wound was first wound; and then the wound wire is cut. Only the portions that will be wound around the commutator leg parts in synchronization with the feed of the wire to be wound from the coil winder are stripped of their insulating coat prior to being wound, and the wound portions of the commutator leg parts are welded.

DETAILED DESCRIPTION OF THE PREFERRED EMBODIMENTS

Figure 4:
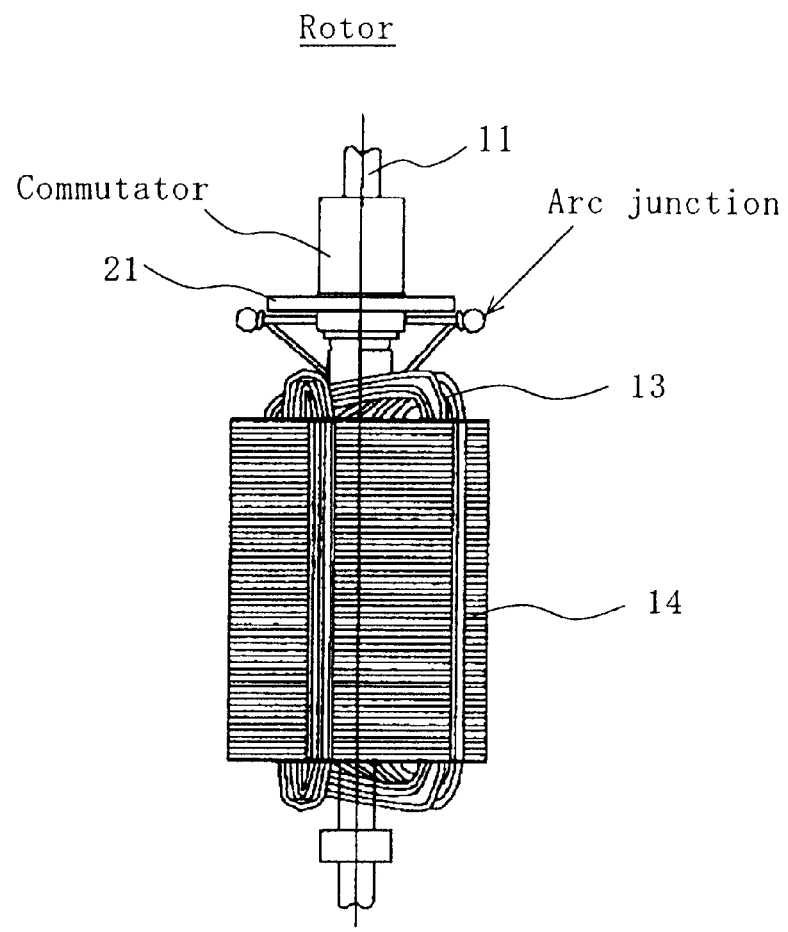
FIG. 4 illustrates the configuration of a rotor for small motors to which the present invention can be applied.

FIG. 4 illustrates the configuration of a rotor for small motors to which the present invention can be applied. The configuration on the stator side is not illustrated here, but any appropriate conventional configuration can be used with this rotor. For instance, a small motor can be completed by inserting the illustrated rotor into a hollow cylindrical metallic case having a bottom, fitted with two magnets on its inner circumference and fitting a case lid to cover the open end of the metallic case. This results in supporting the both ends of the shaft 11 of the rotor by two bearings, of which one is provided at the center of the case bottom and the other, on the case lid. As usual, there is also provided a brush supported by the case lid. This brush, while being in sliding contact with a commutator on the rotor, is coupled to an input terminal penetrating the case lid and protruding inside, to supply electric power from outside.

Over the rotor shaft 11 are configured in a usual manner and fitted a plurality of magnetic poles of the rotor in the salient-pole configuration. Each of these rotor magnetic poles is composed, in a usual manner, of a winding 13 formed around a laminated core 14. The both ends of each of the windings, which are as many as the magnetic poles, are connected by arc junctioning, for instance, after being wound around a commutator leg part coupled to a corresponding commutator segment. As a result, the tip of each commutator leg part, as illustrated, is welded into a ball shape together with the wire wound around it.

Figure 1:
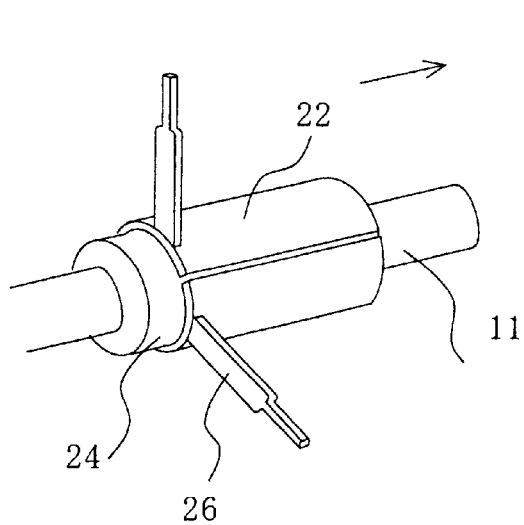
FIG. 1 shows a schematic perspective view of the configuration of a commutator unit to be fitted onto the shaft of the rotor.
Figure 1:
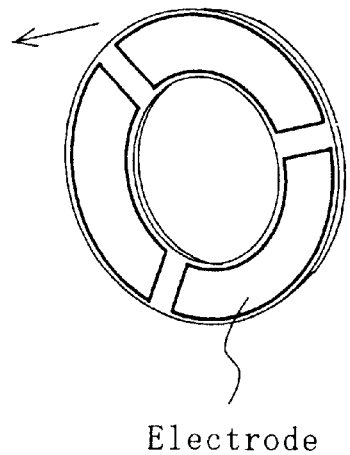

FIG. 1 shows a schematic perspective view of the configuration of a commutator unit to be fitted onto the rotor shaft. In the drawing, reference numeral 11 denotes the shaft of the rotor; 22, a commutator segment; 24, the commutator core; and 26, a commutator leg part. As illustrated, the commutator unit is composed of commutator segments 22 arranged over the resin-made commutator core 24 and the commutator leg parts 26 coupled to the commutator segments 22 to connect wound wire ends. While these commutator leg parts 26 can be formed integrally with the commutator segments to be bendable substantially at a right angle, and more preferably, as will be detailed later on, they can be formed by separately formed commutator leg parts 26 being fixed to the ends of corresponding commutator segments. After the commutator unit is inserted into a hole at the center of the varistor shown in the right part of FIG. 1 to bring the commutator leg parts 26 into contact with the respectively corresponding electrodes of the varistor, the contact parts are soldered. Details of the assembling of the commutator unit will be described afterwards.

Figure 5:
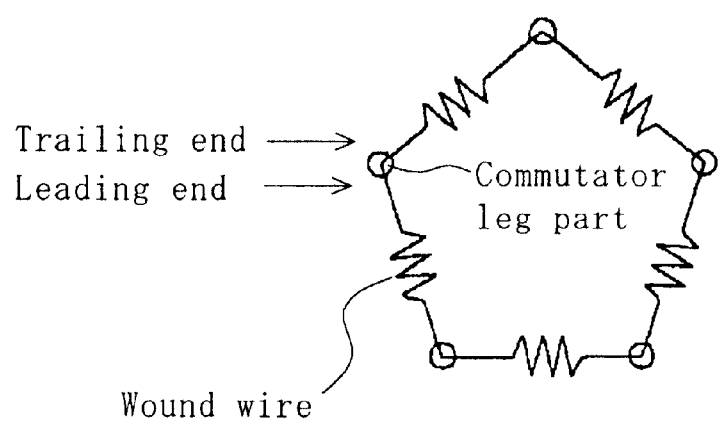
FIG. 5 is a conceptual diagram for illustrating the connection between the both ends of each winding and the corresponding commutator leg part.

FIG. 5 is a conceptual diagram for illustrating the connection between the both ends of each winding and the corresponding commutator leg part. The leading end of an insulator-coated wire is wound around one of the commutator leg parts, the first round of winding is wound around the laminated core and, after the completion of that round, is wound around a second commutator leg part a few rounds. The insulator-coated wire is continuously wound in the second round without being cut, and after the end of that round, wound around a third commutator leg part. In the same manner after that, the insulator-coated wire continues to be wound without being cut until it returns to and again wound around the first commutator leg part, and only then the insulator-coated wire is cut.

According to the invention, in continuously winding the wire around the commutator leg parts, the insulating coat is removed in synchronization with the feeding of the insulator-coated wire to the work (rotor) from a coil winder. Thus, of the continuously fed insulator-coated wire, only the part that will be wound around the commutator leg parts is stripped of its insulating coat prior to being wound.

Figure 6:
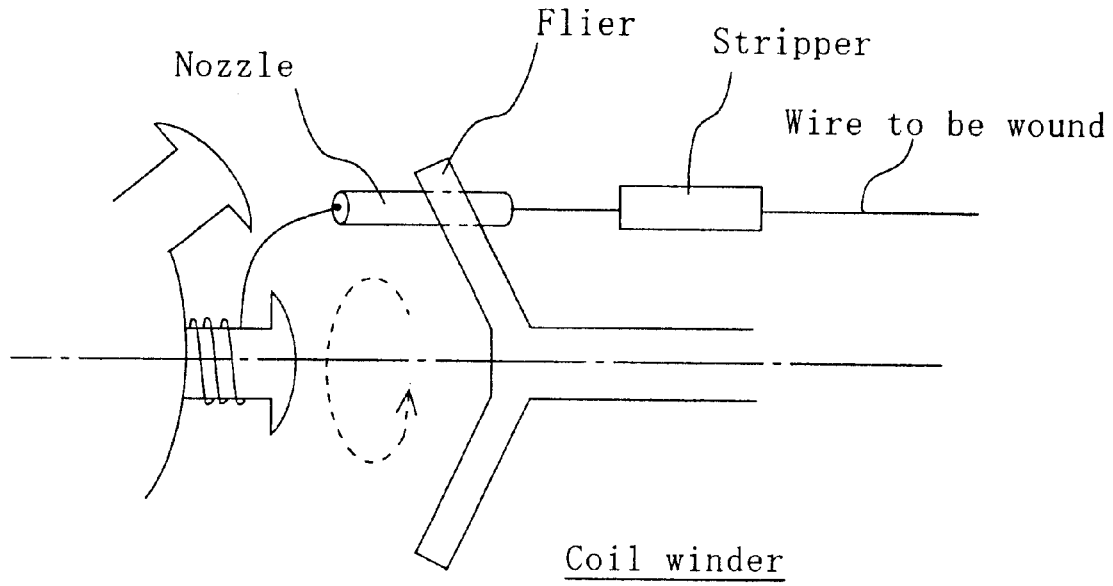
FIG. 6 illustrates how an insulating coat is removed.
Figure 7:
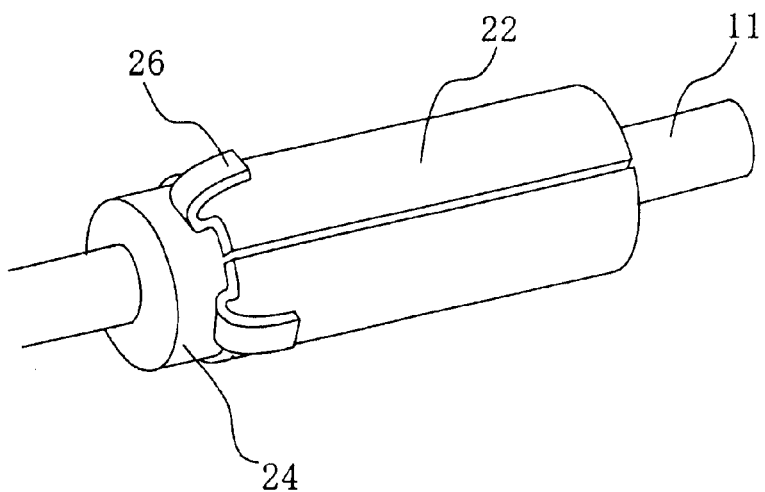
FIG. 7 shows a schematic perspective view of the commutator unit of a small motor according to the prior art.
Figure 8:
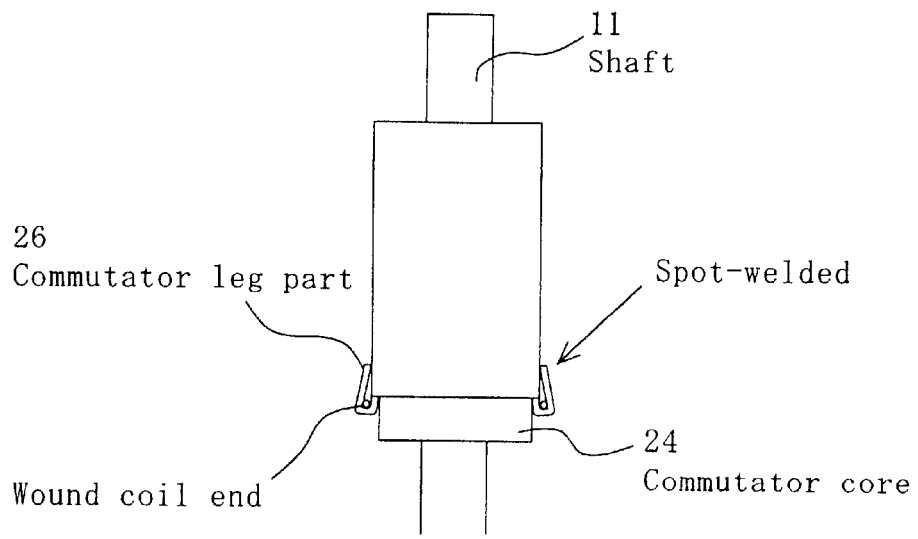
FIG. 8 shows a profile of the commutator unit shown in FIG. 7 in a state of being coupled with a wound wire end.
Figure 9:
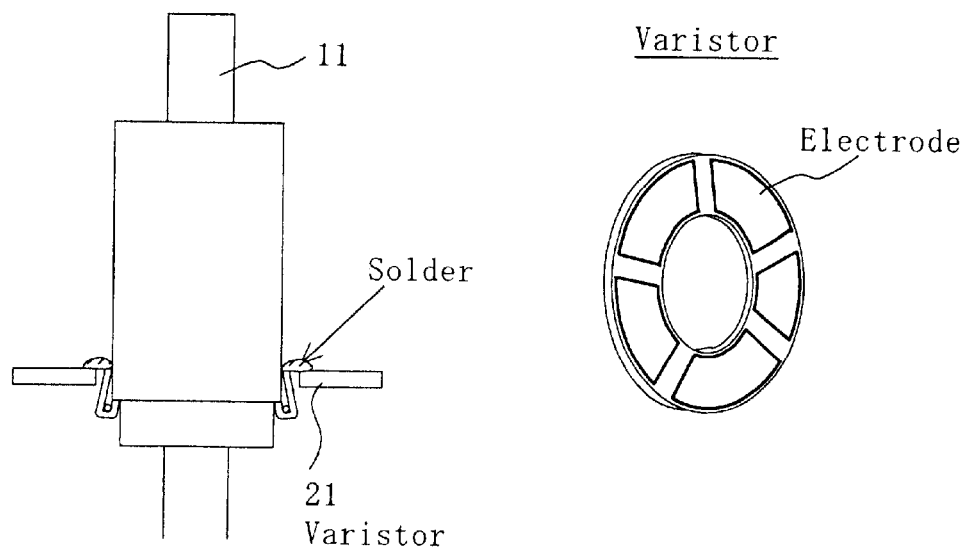
FIG. 9 shows a varistor alone on its right part and the varistor in a fitted and connected state in the left part.

FIG. 6 illustrates how the insulating coat is removed. For winding the wire around the laminated core of the rotor, a coil winder, such as the illustrated coil winder using a flier which in itself is known type, can be used. A flier type coil winder mainly consists of a flier rotating along a prescribed circular orbit, a nozzle fixed to the flier to feed the wire to be wound from its tip, and a former (not shown) for guiding the wire to be wound to the position where it is to be wound. The flier, positioned close to the object to be worked upon, rotates around a salient pole to be worked upon and successively winds around the outer circumference of the salient pole the wire to be wound supplied from the tip of the nozzle while guiding the wire along the outer edge of the former. In this process the number of windings around the salient pole to be worked upon is counted. The round of winding around that salient pole is ended when a prescribed count is reached, and the wire is wound around the commutator leg part a prescribed number of turns. After this round of winding, as described above, the next round of winding is consecutively accomplished in a similar manner.

According to the invention, a stripper for removing the insulating coat in prescribed parts of the wire in synchronism with this wire winding and the feeding of the wire to be wound is combined with the coil winder. This stripper makes it possible to strip only the parts of the wire to be wound around the commutator leg parts of their insulating coat before winding. While the stripping of the insulating coat can be accomplished by any desired means, for instance with a chemical or by laser irradiation, mechanical stripping is more preferable because it would contribute to simplifying the configuration. This can be done by temporarily suspending the feeding of the wire which has been wound a prescribed number of turns around the salient pole to be worked upon, positioning a cutting tool against the outer circumference of the wire, and pulling the wire to be wound in the feeding direction while rotating the cutting tool.

After the wire is wound in this manner and both ends of each round of winding are connected to the commutator leg parts, the rotor is set to an arc welding machine to arc-weld the tips of the commutator leg parts around which the wound wire ends have been wound and to junction the wound wire end to the tip portions of the commutator leg parts by the arc heat.

By removing the insulating coat of the parts before arc-welding or otherwise welding the wound wire ends with the commutator leg parts in this manner, fully satisfactory connection can be established electrically as well.

Furthermore, as the stripping of the insulating coat can virtually limit the material of the wire to copper alone, the most suitable material for the commutator leg parts to be connected to the insulator-coated wire can be chosen, such as phosphor bronze. As the melting point of phosphor bronze is lower than that of copper by 100 degrees or more, the material can stand not only arc welding but also any other thermal method of deposition. Junctioning by resistance welding will further be described below with reference to FIG. 10 and FIG. 11.

Figure 10:
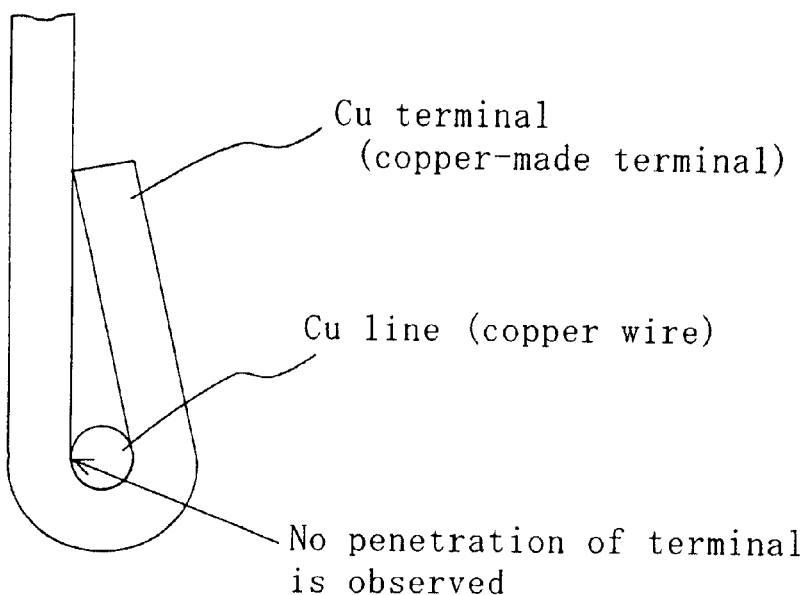
FIG. 10 illustrates junctioning of a copper wire and a copper terminal by resistance welding according to the prior art.
Figure 11:
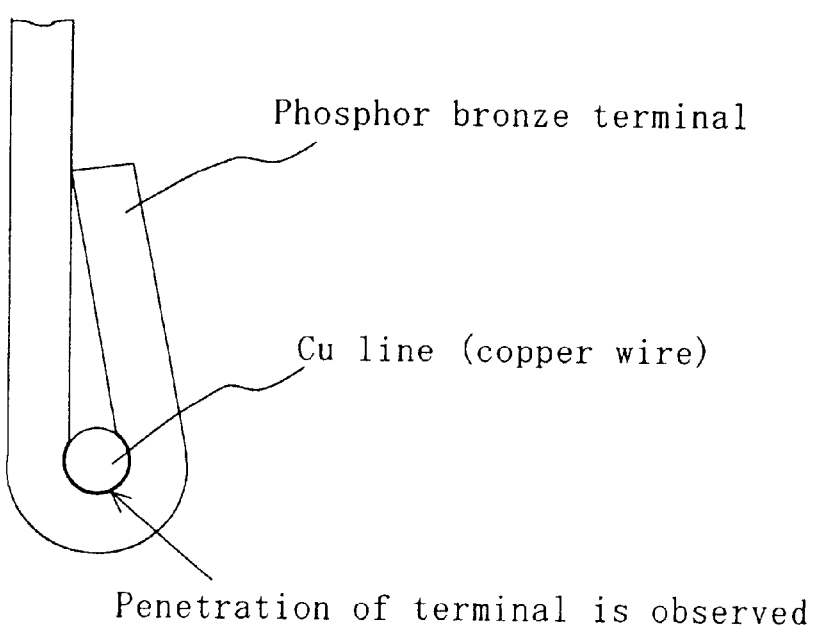
FIG. 11 illustrates junctioning of a copper wire and a phosphor bronze terminal by resistance welding.

FIG. 10 illustrates Functioning of a copper wire and a U-shaped copper terminal (commutator leg part) by resistance welding according to the prior art. As the copper wire and the copper terminal are made of the same material and accordingly have the same melting point, the terminal may not penetrate, inviting disconnection at the time of welding. By contrast, if a U-shaped phosphor bronze terminal is used for the copper wire as shown in FIG. 11, the terminal will penetrate the copper wire because the melting point of the phosphor bronze terminal is lower than that of copper by 100 degrees or more. Thus, also where resistance welding is used, stripping the insulating coat enables the copper wire to be securely connected electrically to the phosphor bronze terminal.

Figure 3:
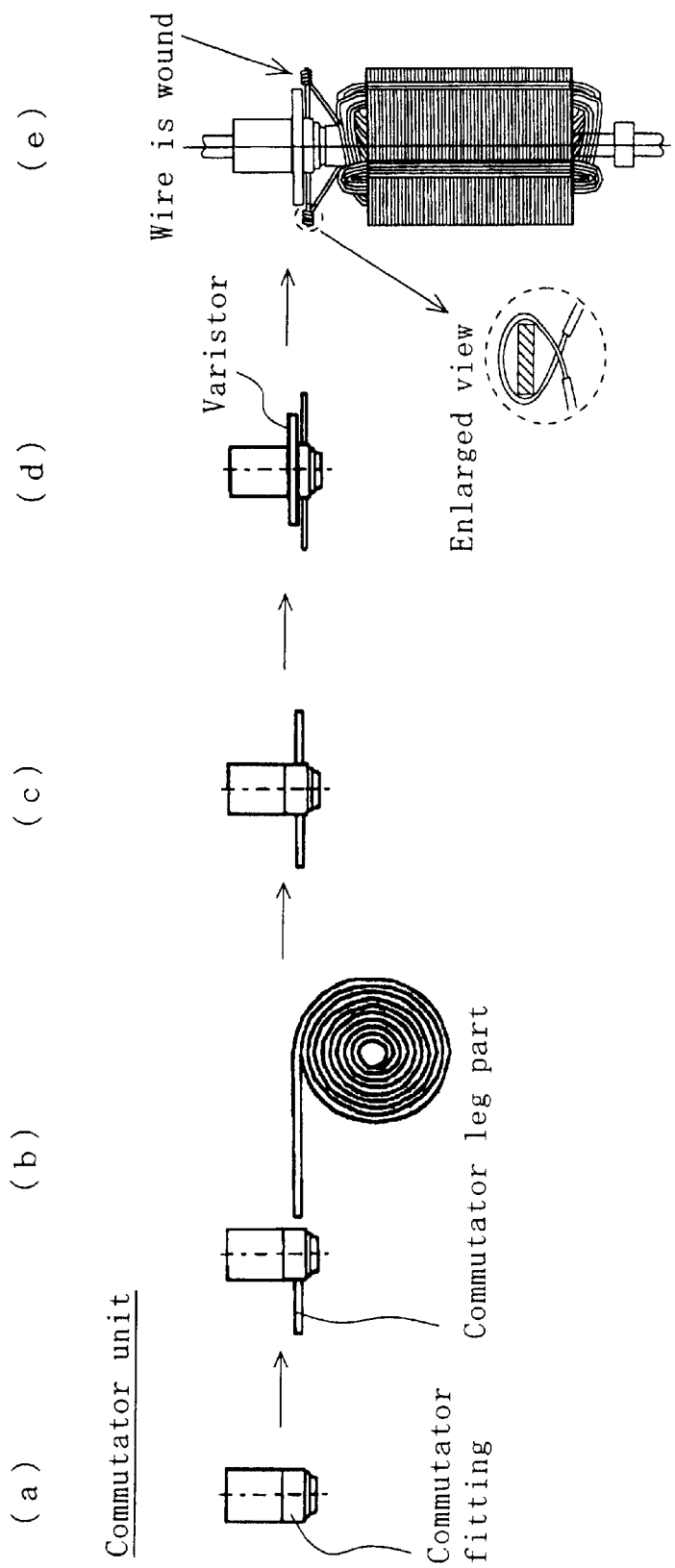
FIG. 3 illustrates how a commutator leg part is installed on a commutator fitting.

FIG. 3 illustrates how a commutator leg part is installed on a commutator fitting. The commutator fitting here refers to an end of a commutator segment, i.e. the part of the commutator segment where the commutator leg part is to be installed. The commutator leg part is installed on the surface of the commutator fitting shown in FIG. 3A so that the leg part extends from there at a right angle to the fitting outward in the radial direction.

Figure 2:
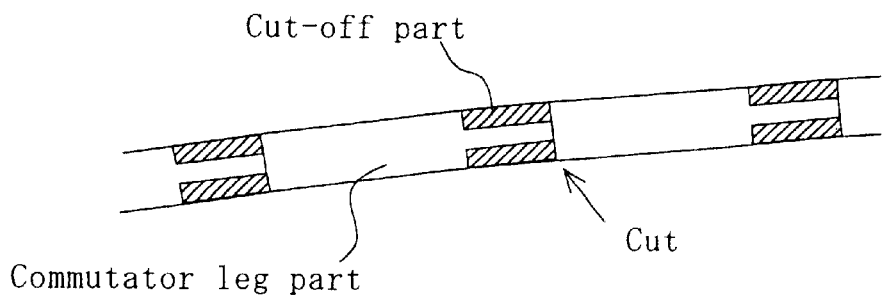
FIG. 2 illustrates a parent metal sheet out of which commutator leg parts are to be punched and the commutator leg part.
Figure 2:
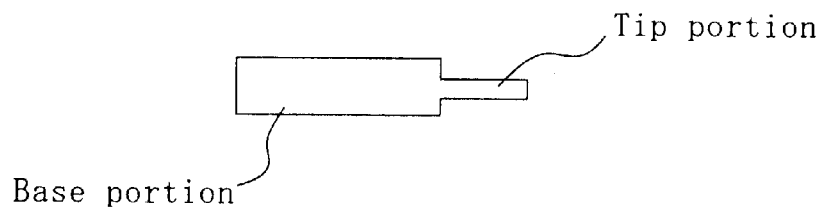

FIG. 3B illustrates a state in which, after one commutator leg part has been installed, a second commutator leg part is to be installed. Further, as shown in FIG. 2, the commutator leg part can be formed by punching (and cutting) out of a reel-wound flat parent metal sheet. This commutator leg part consists of a base portion for supporting the varistor and a tip portion narrowed stepwise to let a wound wire end be wound around it. The length and width of the narrowed tip portion are determined to be optimal for winding the wound wire end around it. While it is possible to fix the commutator leg part to the commutator fitting after it is punched out, it is preferable to punch it out at the same time as fixing it by welding or to punch it out after fixing, because it would enhance the working ease.

FIG. 3C illustrates a state in which the fixing of the commutator leg parts has been completed (only two commutator leg parts are shown here). By forming the commutator leg parts in advance and fixing them instead of forming them integrally with the commutator fitting, the need to make a complexly shaped item is eliminated, resulting in the advantages that the material yield is enhanced, automation is facilitated because intertwining of parts, to which integral formation would be susceptible, does not occur, and the most suitable material for the commutator segments can be chosen irrespective of the material of the commutator leg parts.

FIG. 3D illustrates a state in which a varistor having a hole at the center as shown in FIG. 1 is mounted on the commutator unit on which the commutator leg parts were installed earlier and the electrodes of the varistor are soldered onto the respectively corresponding commutator leg parts. Since a side of each commutator leg part and a side electrode of the disk-shaped varistor are soldered together in this way, soldering can be achieved with remarkable working ease by using a reflow soldering technique. Moreover, since the commutator unit is still a separate element at this stage, there is no risk for the solder to scatter to other parts on the rotor including the windings, and accordingly a washing step can be dispensed with.

FIG. 3E shows a state in which, after the completed commutator unit is mounted onto the shaft, the wire is wound and the wound wire ends are wound around the commutator leg parts. Although the wire can be wound around each commutator leg part a plurality of rounds, a state after only one round of winding is shown in an enlarged view to make the illustration clearer. After that, the tip of each commutator leg part is arc-junctioned to complete the rotor (see FIG. 4).

In the present invention, welding between the wire-wound portion of each commutator leg part and only a wire portion to be wound around commutator leg parts in synchronism with the feeding of the wire from the coil winder is performed after the parts of the wire to be actually wound are stripped of their insulating coat in advance. Therefore, even if a material having too high a melting point to be melted by the arc heat is used as the insulating coat of the wound wire, adequate electrical connection can be established. Moreover, there is no fear of toxic gas generation, which is an advantage in environmental conservation.

Also, by stripping the insulating coat and thereby limiting the material of the many different types of insulator-coated wires that are used virtually to copper alone, the invention enables the most suitable material for the commutator leg parts to be connected to the wires, resulting in enhanced reliability of connection.

What is claimed is:

1. A manufacturing method for a rotor for small motors provided on its shaft with a plurality of rotor magnetic poles of a salient-pole configuration and a commutator unit, each of the rotor magnetic poles being composed of a winding around a laminated core and each of both ends of each wound wire being connected to a commutator leg part coupled with a tip of a corresponding commutator segment of the commutator unit, said method comprising steps of:

winding a leading end of a wire to be wound fed from a coil winder around one of commutator leg parts a first prescribed number of turns, then winding the wire around a corresponding salient pole a second prescribed number of turns, thereafter similarly winding the wire successively around other commutator leg parts and other salient poles, and winding the wire around the same commutator leg part around which the leading end of the wire to be wound was first wound, and then cutting the wire;

stripping the insulating coat from only the portions to be wound around the commutator leg parts prior to being wound in synchronization with feed of the wire to be wound from the coil winder; and welding the wound portions of said commutator leg parts.

2. The manufacturing method for a rotor for small motors, as set forth in claim 1, further including steps of punching and cutting -out of a reel-wound flat parent metal sheet each of said commutator leg parts having a base portion coupled to a tip of a commutator segment and a tip portion narrowed stepwise to let a wound wire end be wound around it, and at the same time, fixing the commutator leg part to the commutator segment tip outward in a direction substantially normal to a radial direction from the commutator segment tip.

3. The manufacturing method for a rotor for small motors, as set forth in claim 2, further including steps of mounting a disk-shaped varistor having a hole at its center over the base portions of said commutator leg parts on the reverse side to the winding in an axial direction of a shaft, and soldering each electrode of the varistor onto the corresponding base portion.

4. The manufacturing method for a rotor for small motors, as set forth in claim 1, wherein said commutator leg parts are U-shaped and formed of a metal whose melting point is lower than that of copper.

5. The manufacturing method for a rotor for small motors, as set forth in claim 4, wherein a material of said commutator leg part is phosphor bronze.

* * * * *